Figure 1:
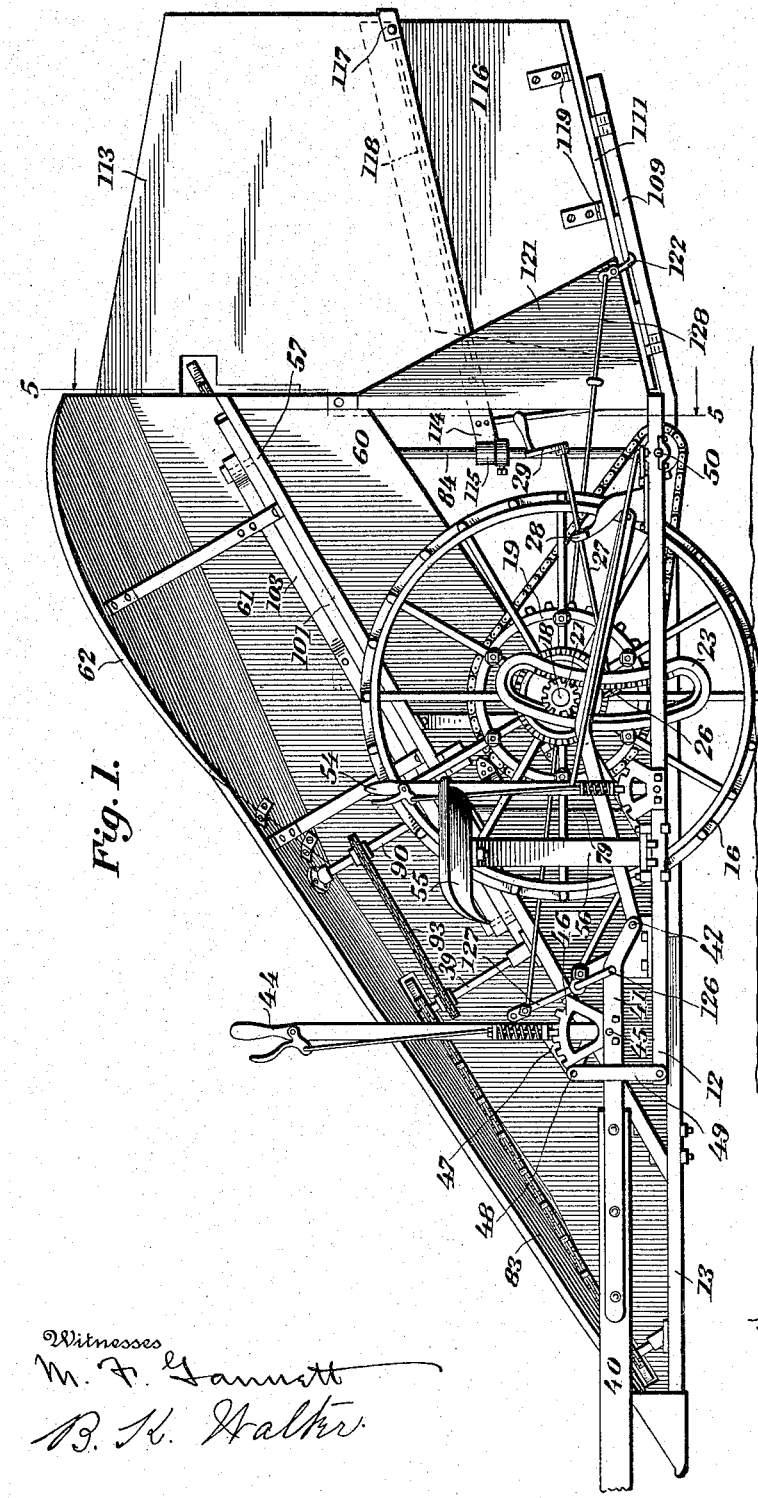

G. D. NEAVITT.
CORN HARVESTER.
APPLICATION FILED APR. 23, 1914.

1,176,398.

Patented Mar. 21, 1916.
7 SHEETS—SHEET 1.

Witnesses
M. F. Gannett
B. K. Walker

Inventor
G. D. Neavitt
By Maunder
Attorneys

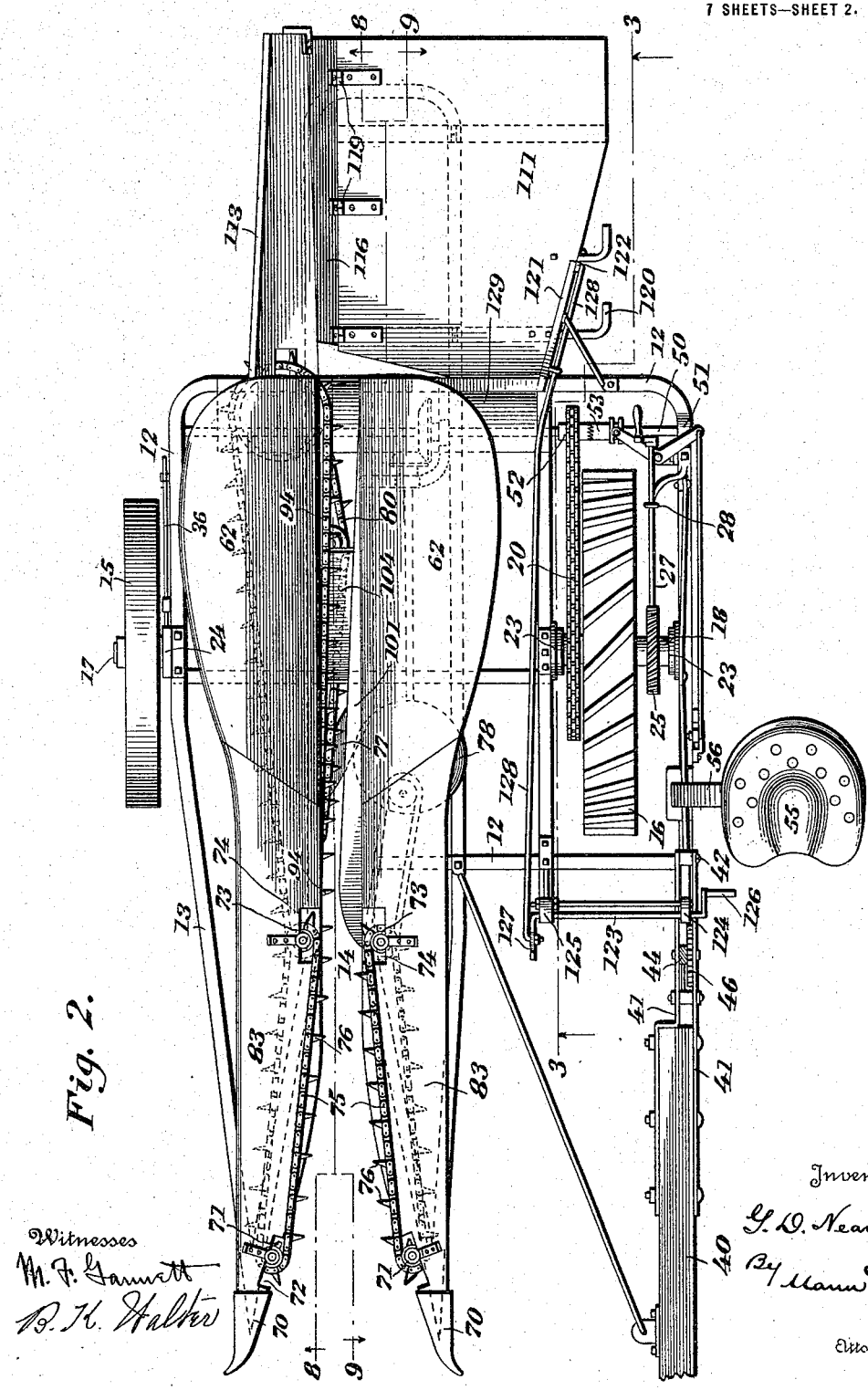

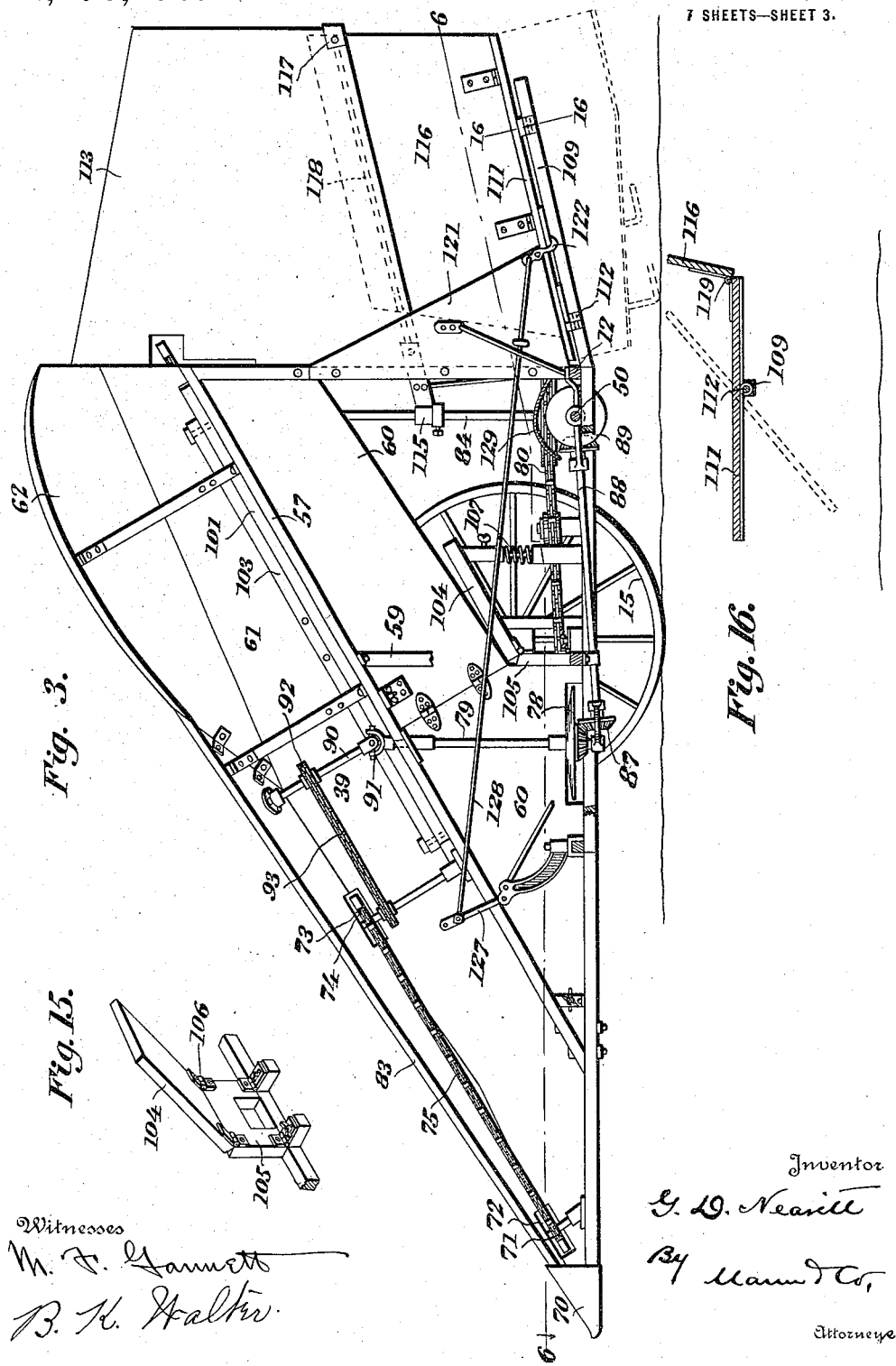

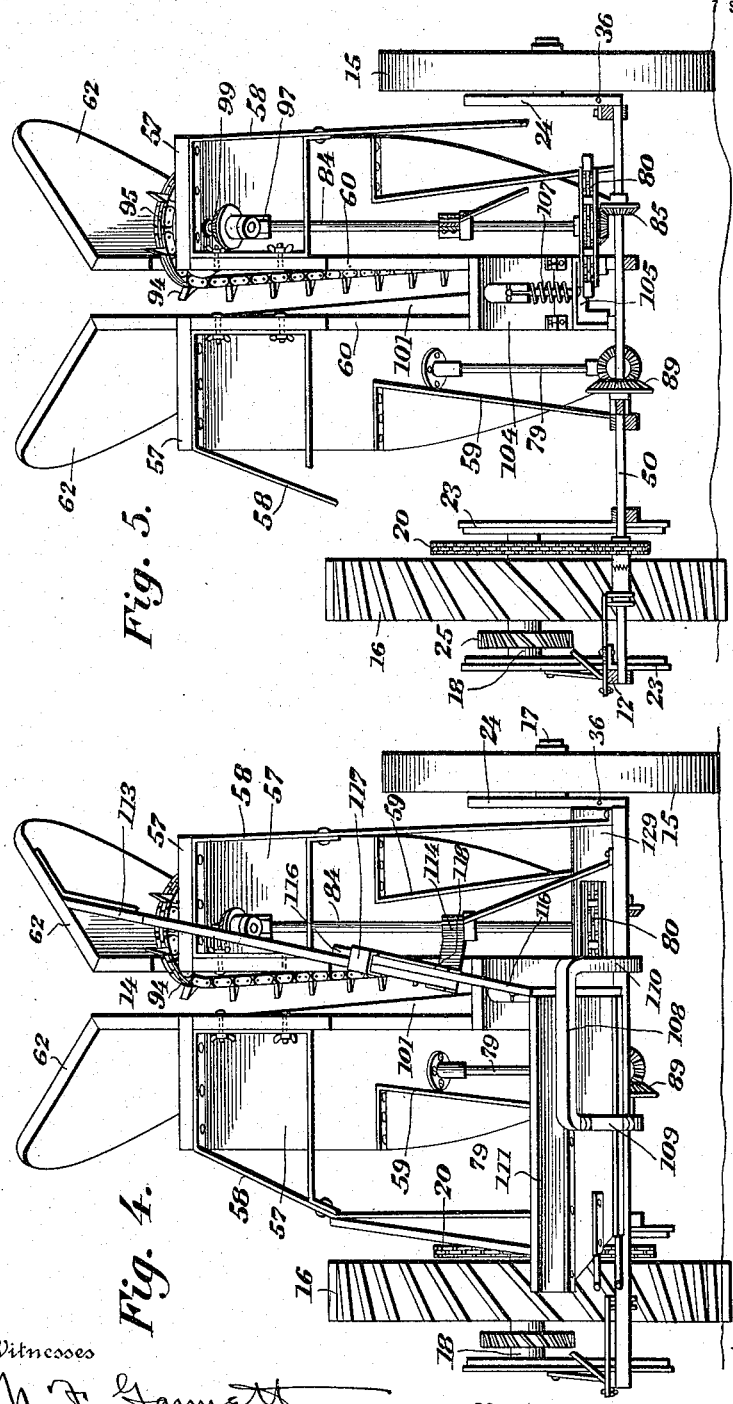

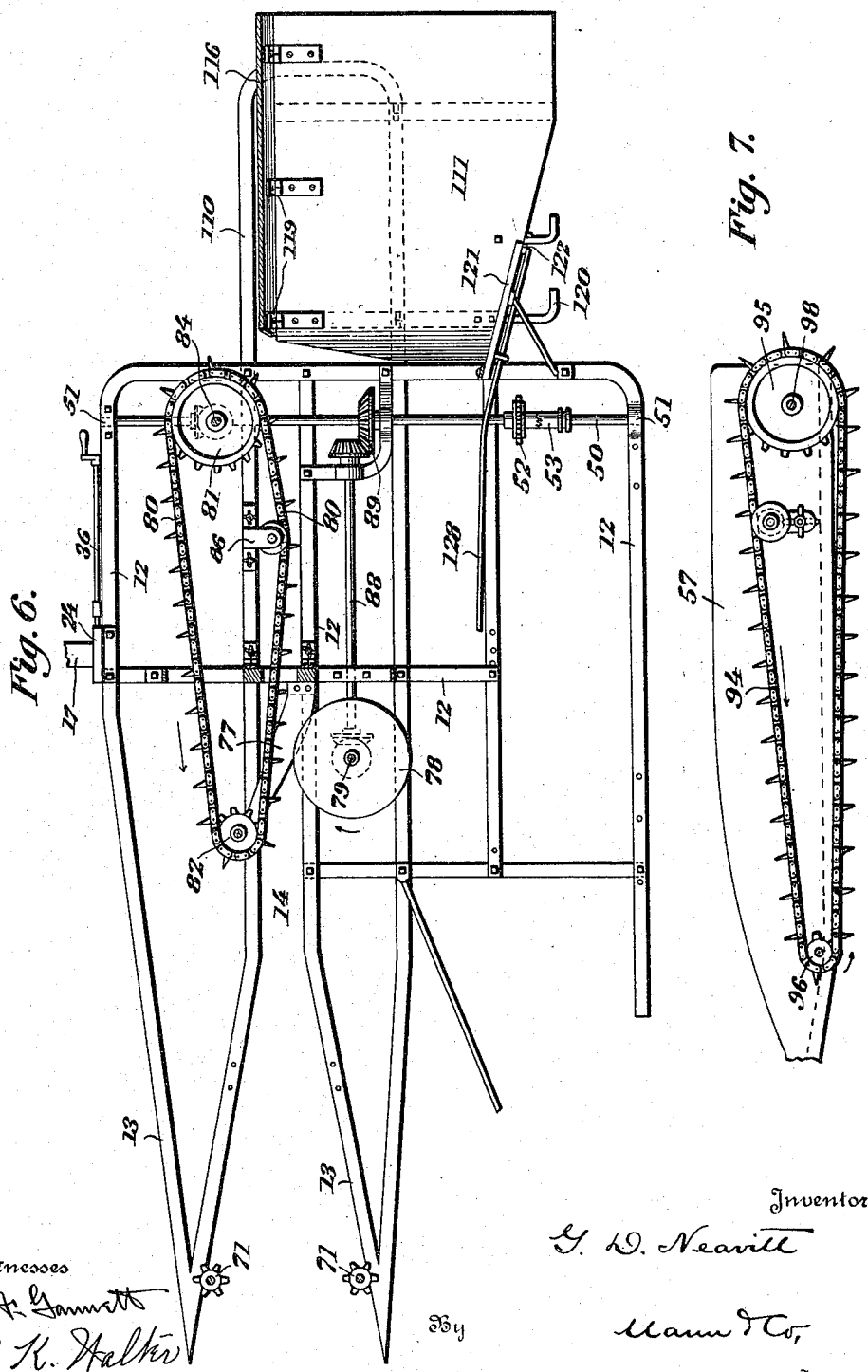

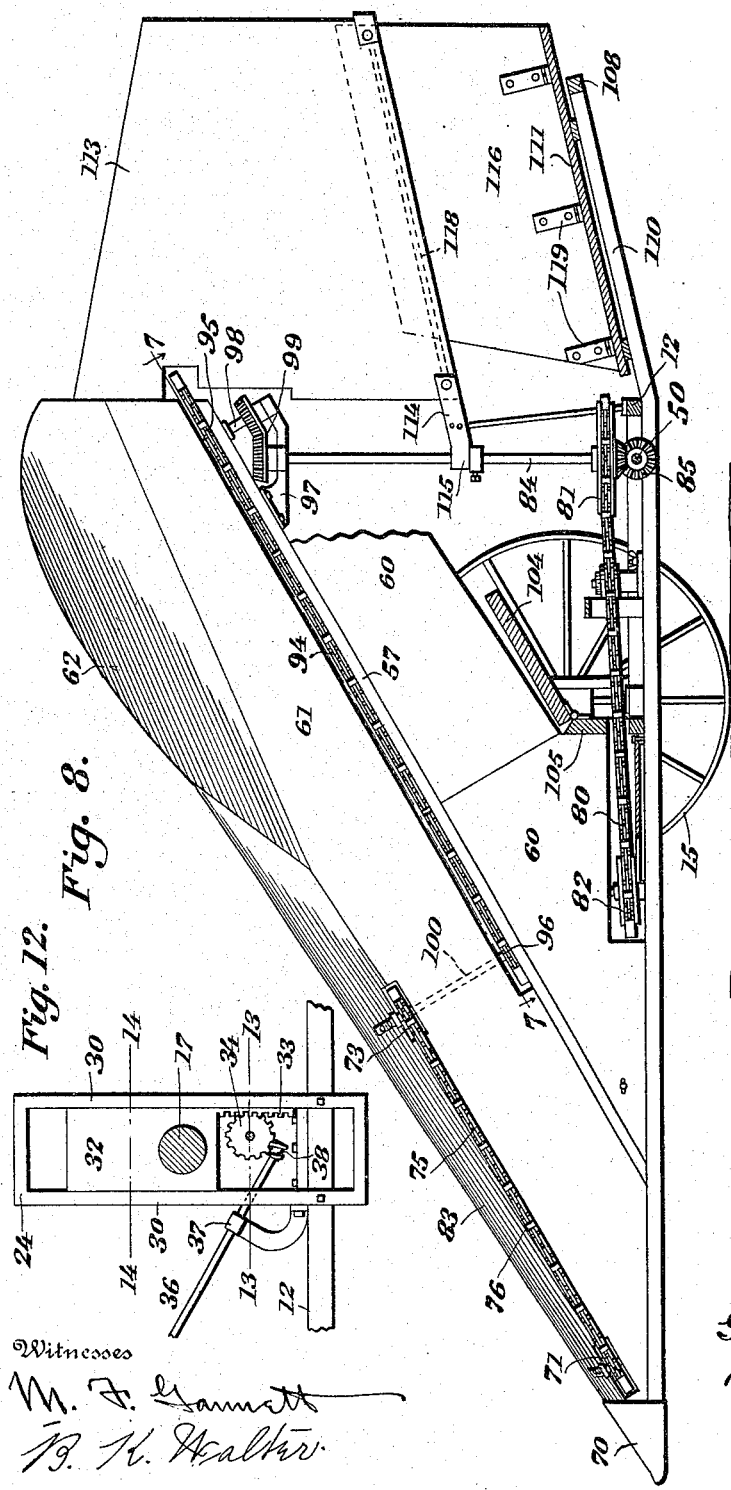

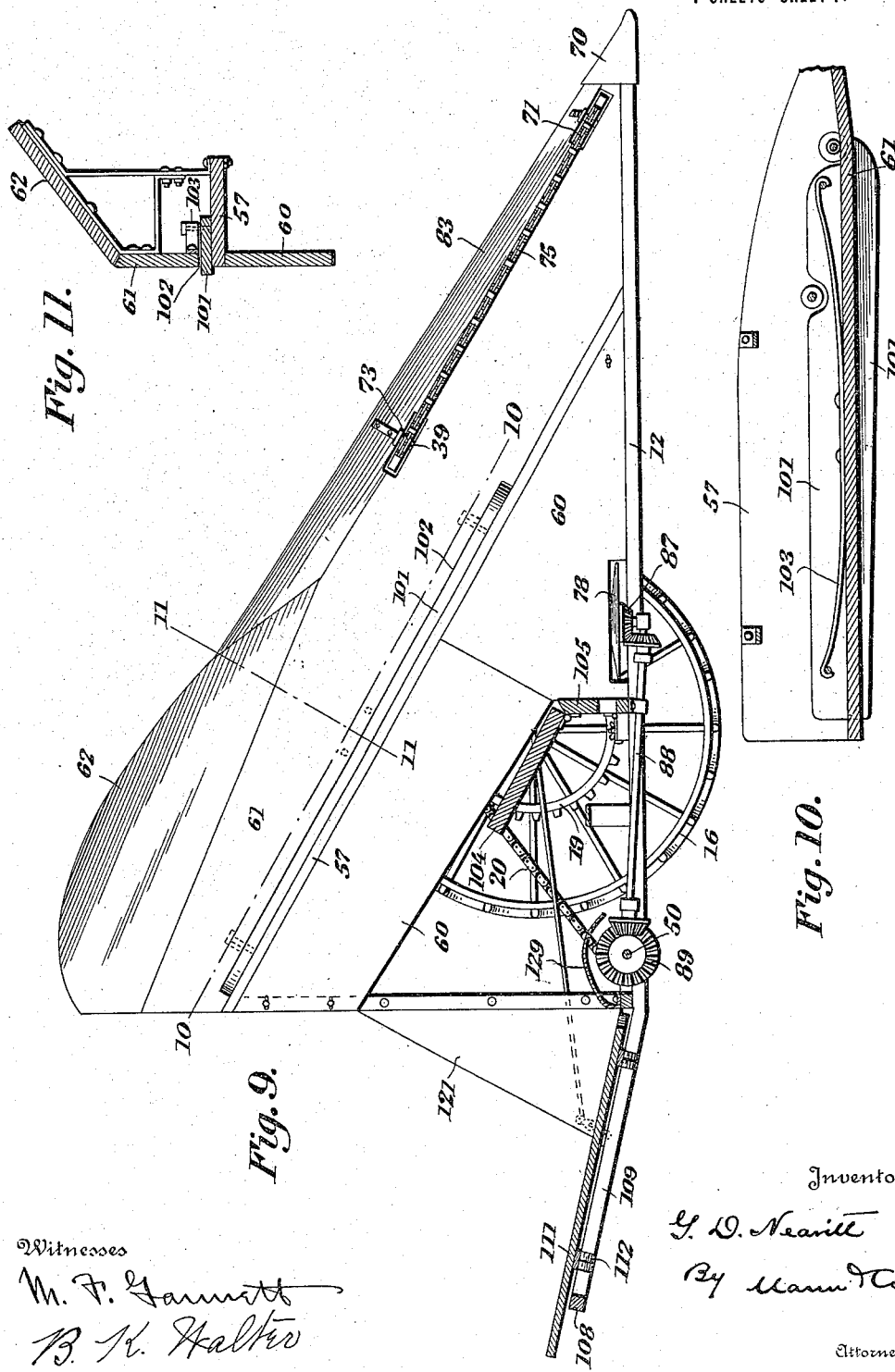

UNITED STATES PATENT OFFICE.

GEORGE DAVIS NEAVITT, OF CENTERVILLE, MARYLAND.

CORN-HARVESTER.

1,176,398.        Specification of Letters Patent.        Patented Mar. 21, 1916.

Application filed April 23, 1914. Serial No. 833,989.

*To all whom it may concern:*

Be it known that I, GEORGE DAVIS NEAVITT, of Centerville, in the county of Queen Annes and State of Maryland, have invented certain Improvements in Corn-Harvesters, of which the following is a specification.

This invention relates to an improved machine for harvesting corn standing in the field.

The invention has for one of its objects to provide mechanism to facilitate cutting the stalks of standing corn particularly where the stalks have been beaten by wind or rain storms from a vertical to an inclined position.

Other objects will be stated in the description hereinafter set forth.

The invention is illustrated in the accompanying drawings in which,—

Figure 1 is a left-hand side view of the machine. Fig. 2 is a top view of the body of the machine. Fig. 3 is a vertical longitudinal section of the machine on the line 3—3 of Fig. 2 and shows the outer surface of the left-hand side. Fig. 4 is a vertical elevation, or rear end view of the machine. Fig. 5 is a vertical cross-section on the line 5—5 of Fig. 1. Fig. 6 is a plan view of the framework of the machine, showing the parts on line 6—6 of Fig. 3. Fig. 7 is a view of the elevating chain on the inclined plane 7—7 of Fig. 8. Fig. 8 is a vertical longitudinal section on line 8—8 of Fig. 2 and shows the inner side surface of the right-hand side. Fig. 9 is a vertical longitudinal section of the machine on the line 9—9 of Fig. 2; this figure shows the inner surface of the left-hand side of the machine. Fig. 10 is a view of the spring-pressed board, being a section on the line 10—10 of Fig. 9. Fig. 11 is a vertical section on the line 11—11 of Fig. 9. Figs. 12, 13, and 14 show raising and lowering means. Fig. 15, is a perspective of the trip-board. Fig. 16, shows two positions of the tilting platform.

The frame 12 of the machine is shown in Fig. 6 and is made of suitable bars either angle-iron or tubular; some of the bars are placed longitudinally and others crosswise. The frame has two forward-tapered arms, 13—13, which at their front ends are pointed, and the space between the arms commencing at the points contracts from said points like a V until near the cutters; immediately in front of the cutters the space terminates in a parallel-sided passage, 14. This frame supports all parts of the machine and the whole is carried on two wheels that travel on the ground; one wheel, 15, is a free rolling wheel, and the other wheel, 16, supports the machine and also is a power wheel to drive the mechanism. The wheel, 15, turns on an arm, 17, projecting from a standard, 24, which is secured to the frame; and the power wheel, 16, turns loose on a shaft, 18. The power wheel at its inner side, carries a sprocket-wheel, 19, over which a sprocket chain, 20, passes and serves to transmit motion to the mechanism, as will be presently explained.

The shaft, 18, on which the power wheel turns, carries two pinions, 21, each of which gears with a curved rack, 22, at the inner side of two link-shaped frames, 23. The link-shaped frames are stationary, and the power wheel has position between the said two frames. The pinions, 21, and the curved racks, 22, are part of the means for bodily raising or vertically adjusting the left-hand side of the machine. The mechanism for bodily raising or vertically adjusting is substantially like means proposed or shown in prior patents for accomplishing the same purpose. A worm wheel, 25, is fixed on the same shaft, 18, to which the two pinions, 21, are attached and a worm screw, 26, gears with the wheel and is carried on a shaft, 27, that turns in bearing, 28; a crank-arm, 29, on said shaft serves to turn the said worm and the effect of such turning is to either raise or lower the said shaft, 18, and this raises or lowers bodily the left-hand side of the machine. The right-hand side of the machine is raised, or lowered by means associated with the vertical standard, 24, and is shown in Figs. 12, 13 and 14; this standard has two vertical bars, 30, each of which has a groove, 31; a block, 32, has on two opposite sides a tongue that fits movably in said grooves; this block carries the projecting arm or spindle, 17, on which the wheel, 15, turns. A vertical rack-bar, 33, projects downwardly below the said block, and a pinion wheel, 34, engages with the teeth of said rack-bar, and said pinion is on a pin and turns between two plates, 35, which are secured to one of said two vertical bars, 30. A rod, 36, is mounted in a suitable bearing, 37, and carries at its lower end a screw worm, 38, which engages the teeth of the said pinion wheel, 34. By turning the rod the worm will turn the pinion, 34, and cause the block, 32, to be either raised or lowered; as this block carries the arm or wheel-spindle, 17, it will be understood the right-hand side of the machine will be vertically adjusted.

At the left side of the machine is a draft pole, 40, suitably provided at its rear end with irons, 41, the extremity of which has a pivot or joint, 42, that connects with the frame of the machine. This joint, 42, permits the front ends of the two points, 70, to be either raised or lowered to meet the condition of the uncut corn stalks. In case the corn has been beaten down by rain or wind storm, it becomes desirable to have the said front points, 70, closer to the surface of the ground. The height of the said points from the ground may be regulated by the hand lever, 44, whose lower end is pivoted at, 45, to the irons, 41, on the draft-pole. A toothed rack, 46, is also secured to said pole-irons, and has a curve that is concentric with the said pivot, 45. This lever also carries a spring-pressed bolt that engages the teeth of the curved rack, 46; the lower end of this lever is provided with a lateral arm, 47, at the end of which is a joint, 48, which connects with a link-bar, 49, that is jointed to the frame, 12.

The main drive-shaft, 50, extends crosswise of the frame, 12, and at its ends this shaft turns in bearings, 51, on the frame; this shaft carries a sprocket-wheel, 52, fixed thereon and over which the drive chain, 20, is carried. A clutch, 53, of familiar construction is on the shaft, 50, and may engage with, or be disengaged from, the said sprocket, 52; when disengaged the machine may be moved over the ground and the mechanism remain motionless; but when the clutch engages the sprocket, 52, on the shaft while the machine is moving forward the mechanism will be in motion. This clutch is controlled by a hand-lever, 54, in proximity to the driver's seat, 55, which is supported by a standard, 56.

The several connections leading from the main shaft, 50, to various parts will be described in the order of their mention hereinafter.

In general the entire two side walls of the machine have the same shape. This wall structure will be seen and understood by reference to Figs. 3, 5 and 8. Each side of the machine has a board, 57, whose flat surface or cross width (see Fig. 5) is in a horizontal plane; the rear end of this board is high and the board inclines downward toward the front, and the lower front end of the board rests on the frame, 12. These two boards are stayed by braces 58, 59, and the two boards at the center of the machine are separated along their entire length by an open space, 14, that continues longitudinally. The two boards may be either wood or metal.

Below each inclined board, 57, at its center edge is a vertical wall, 60. Above each inclined board is another vertical wall, 61, and on top of this highest wall each side has a wing, 62, whose outer edge is highest and inclines downward toward the central longitudinal open space, 14.

At the extreme front point of each tapered gathering board, 83, in Fig. 2, is a tapered curved prong, 70, and near said prong is a sprocket wheel, 71, mounted in a slot, 72, formed in the sidewise-inclined gathering board, 83, and another sprocket, 73, is higher on said board and is mounted in a slot, 74, and an endless gathering chain, 75, is carried on these two sprockets. Each of the two gathering boards, 83, has an endless gathering chain, 75, see Fig. 2; and these chains are provided with prongs, 76, that project into the V-space which latter receives the standing stalks of corn as the machine advances, and said prongs from opposite sides contact with said standing stalks and pull them to a slightly inclined position toward the body of the machine. This provision of two endless gathering chains, one at each side and positioned in advance of the cutters, is found in practice to be much superior in action to only one gathering chain.

Two cutters are employed, one being a straight blade, 77, in a horizontal plane but positioned obliquely across the straight narrow part of the center space, 14, and secured to the bars of the frame, 12; the other cutter, 78, is circular-shaped and has a convex upper surface which makes it self-clearing and is revoluble being mounted at the lower end of an upright shaft, 79; the lower surface is flat diametrically across and the circular rim of this cutter slightly overlaps on top of the flat surface of said oblique cutter-blade, 77; thus the straight edge and the circular edge of the two cutters form an intersecting V-shaped cutting notch, shown in Fig. 6; which is effective in clearing itself.

To prevent an accumulation of leaves, grass, pieces of corn stalk or other trash that might choke said V-shaped notch, I have provided an endless chain, 80, having projecting prongs; this chain passes rearwardly over the oblique blade, 77, and constantly removes the trash. The chain also serves to drag the cornstalks past the two cutters, and insures that the standing stalks will be completely severed. Said chain, 80, travels over two sprocket wheels, 82 and 81, the latter being carried on a vertical shaft, 84, which is driven by bevel gears, 85, that connect with the main drive shaft, 50. A chain-tightener, 86, is provided, see Fig. 6, to tighten or loosen the chain, 80.

The upright shaft, 79, passes loosely through the downward inclined board, 57, and the upper end of the shaft above said board is connected with an inclined shaft, 90, by a universal-joint coupling, 91. Said inclined shaft carries a sprocket, 92, and a chain, 93, communicates motion from said sprocket to an inclined shaft, 39, which carries the highest sprocket, 72, on the left-hand gathering board 83. Said highest sprocket carries the gathering chain, 75, on the left side of the machine. The said upright shaft, 79, is driven at its lower end by bevel-gears, 87, connecting with a horizontal shaft, 88, and by bevel-gears, 89, that connect with the main shaft, 50.

The moment the standing corn stalks have been cut or severed by the cutters, 77, 78, it is advantageous to trip-up the cut ends of the long stalks to facilitate the upper part of said cut stalks to incline rearwardly, and to pass downward in the center space, 14. To serve this purpose I provide a trip-board 104, see Figs. 2, 3, 5 and 15. This device comprises an upright standard, 105, at the top of which are hinges, 106, that hold one end of the trip-board, 104; the opposite or free end of said board is arranged to be raised by a spring, 107, which is below the board and which sustains said free end normally at an inclined position, the free end being higher than the hinged end. When the cutters, 77, 78, have severed the corn-stalks, the forward movement of the machine causes the said standard, 105, to strike against the ends of said severed stalks and trip them upward; the stalks are at once taken hold of by the inclined elevating chain, 94, at the right hand of the machine. If the stalks produce down-pressure on the hinged board, 104, the same will momentarily yield and the board will tilt down, and instantly as such pressure ceases, or is sufficiently diminished, the spring, 107, will elevate the board and the latter will raise the cut ends of the corn stalks in the center space, 14, of the machine. The stalk ends thus loosened and raised will be moved along rearwardly by the chain, 94.

The elevating chain, 94, is immediately above the inclined board, 57, at the right side of the machine, and runs over two sprockets, 95, 96. The vertical shaft, 84, has its upper end in a bearing on a bracket, 97, below the inclined board, 57, at the right side of the machine. This bracket sustains a short inclined shaft, 98, which carries said sprocket, 95; and bevel-gears, 99, above the said bracket transmit the motion. There is only one elevating chain, 94, and this runs over the lower sprocket, 96, which is on an inclined shaft, 100, shown in broken lines, Fig. 8, which carries the upper sprocket, 73, of the gathering chain. Thus the shaft, 100, is the means for transmitting motion to the gathering chain, 75, at the right hand side.

The wall at the left-hand side of the machine is provided with a movable press board, 101, which rests loosely upon the inclined board, 57, at that side, see Figs. 9, 10 and 11. The vertical wall, 61, has an inclined slot, 102, which permits the edge of said press-board to project through to the central space, 14, where said projecting edge is directly opposite the inclined elevating chain, 94. A spring, 103, is attached to a fixed or stationary part,—in the present instance to the wall, 61,— and bears against the movable board, 101, and presses said board toward the elevating chain, 94. While the movable board is thus pressed, its edge never contacts with said chain. The function of this spring-pressed board, is to force the passing corn-stalks against said chain, 94, where the stalks will be engaged by the chain-prongs, but if said stalks should choke the said space, 14, the spring, 103, would yield to permit such stalks to pass along to the dumping platform at the rear end of the machine. At the rear end of the machine I provide a specially contrived platform onto which the elevating chain, 94, deposits the cut corn-stalks and which platform may be tilted at any time by manually operating a crank-arm.

The following is a description of the platform and its associated parts; I form at the rear of the frame, 12, an extension consisting of a prolongation of two of the longitudinal bars of said frame—said two extended bars 109 and 110 at their extremity being united by a cross-bar, 108. This frame extension has an upward inclination whereby the cross-bar end, 108, is higher than the main horizontal part of the frame. The platform, 111, rests on the said upwardly-inclined extension and is connected by hinges 112, to the left-hand extended bar, 109; this bar is under the longitudinal center of the platform and when the platform tilts, one edge (the left-hand) tilts down while the opposite edge (the right hand) tilts up, as shown in Fig. 16. At the right-hand side of the platform is a stationary wind-board, 113, in an upright position with the plane of its flat surface alined in the longitudinal direction of the machine. This wind-board is at the right-hand side of the center space, 14, as shown in Fig. 4. The top end of said wind-board, see Fig. 4, is secured by an angle-iron to the top inclined wing, 62, at the right-hand side of the center space, 14; and the bottom end of said wind-board is secured by an arm, 114, one end of which is made fast to said board and the other end has an eye, 115, that takes around the upright shaft, 84; the wind board is thus sustained. At the lower end of the wind board is an upright side board, 116, whose upper edge laps the bottom edge of said wind board, and a clip, 117, is secured to the lower rear corner of said wind board and bends around the rear edge and loosely engages the rear edge of said lapped part of the board, 116; a rod, 118, shown in Fig. 3 by two parallel broken lines, is at the back of said lapped part and connects from the clip, 117, to the arm, 114.

When the side board, 116, is in the position shown in Figs. 3, 4 and 8, it is a supplement or lower-end extension of the wind board. The wind board serves two purposes, namely, first to direct the corn-stalks, when tilting down at the rear end of machine onto the platform, 111; and second to shield the stalks from wind while the stalks are falling upon the platform. The bottom edge of the said board, 116, is connected by means of suitable hinges, 119, with the up-tilting edge of the platform, 111. By this construction when the platform tilts on the hinges, 112, the upright board, 116, is moved to the position indicated by broken lines in Fig. 16. The outer edge of the platform is provided with one or more L-shaped hooks, 120; when this edge of the platform tilts down, these hooks act as runners to slide along the ground and prevent the ground, or stones on the ground, injuring the edge of the platform.

At the outermost part of the left side, and at the rear end of the machine, is an upright side board, 121, which is braced and rigidly attached. The bottom edge of this board is directly over the surface of the platform, 111, but has no mechanical connection therewith, as the platform itself may tilt downward away from the bottom edge of said upright board, 121. Said board serves to assist in temporarily keeping the corn-stalks upon the platform until the moment for tilting the latter arrives. The board tapers from the bottom upward to a pointed top. A catch-hook, 122, is pivoted on the side at the lower end of the board, and the lower end of said hook engages below the edge of the platform, 111, see Figs. 1 and 3; this hook keeps the platform in its up position. A rock-shaft, 123, is mounted in two bearings, 124, 125, near the seat, 55. The outermost end of this rock-shaft has a crank-arm, 126, that is to be operated manually, and the other end of said shaft has an arm, 127; a rod, 128, extending horizontally connects the last named arm of the rock-shaft with the upper end of said catch-hook, 122. When the platform is loaded with corn-stalks, and it is desired to dump the same, the person resting on the seat, 55, may use his foot to kick the crank-arm, 126, and thereby cause the rod, 128, to release the catch-hook, 122, and allow the platform to tilt, as shown in Figs. 3 and 16. Upon tilting the platform, the corn-stalks will be dumped on the ground and will lie lengthwise in a line even with the direction the machine is moving. When the dumping action has been completed the down-tilted platform will automatically tilt back to its normal position. This automatic recovery of position of the platform is due to the greater weight of the high side of the platform, which greater weight is caused by the weight of the side board, 116, resting thereon. The main-shaft, 50, the clutch, and the gearing on said shaft is guarded by a sheet-metal cover, 129, whose upper surface is rounded or partly cylindrical.

The foregoing specification includes a description of the construction of the parts and also a description of the operation of the same.

It is understood that various changes in the form of the parts shown in the drawing of this machine, and in the proportion of size of some parts relative to other associated parts shown in said drawings, may be made without departing from the scope of my invention as set forth in the claims appended hereto.

Having described my invention what I claim is,—

1. In a corn harvester machine, the combination of a horizontal base frame; two side walls resting on said frame and said walls separated from each other along their entire length by a longitudinal open passage the forward part of which is bottomless; corn-stalk cutters mounted on the said frame at the rear end of said bottomless part of the passage; and a trip-board having position across said passage and the forward end of the board hinged where the bottomless part of said passage terminates, leaving the rear end of said board free to move up and down and said rear movable end being spring-sustained normally at an inclined position and higher than the forward hinged end and adapted to loosen and raise the cut ends of the corn-stalks.

2. In a corn harvester machine, the combination of two side walls highest at the rear end and therefore inclining downward to the front and separated along their entire length by a longitudinal center open space; corn-stalk cutters mounted at the bottom part of said open space; an endless chain having prongs and mounted on one side of the machine and the prongs of said chain projecting into said center open space; and a spring-pressed board, 101, mounted on the side of the machine opposite from said chain with the edge of the board parallel with the stretch of prongs projecting from said chain and serving to force the corn-stalks against said prongs.

3. In a corn harvester machine, the combination of two side walls highest at the rear end and therefrom inclining downward to the front and separated along their entire length by a longitudinal center open space; a wing at the top of each side wall and each wing inclining laterally toward the said center open space; two inclined boards whose flat surface or cross width is uppermost—one such board being below each top wing; an elevating chain 94 running over sprockets and resting on said flat surface of the inclined board at one side; and a movable inclined spring-pressed board 101 resting on said flat surface of the inclined board at the side opposite said chain.

4. In a corn harvester machine, the combination of a horizontal base frame; two side walls resting on said frames and separated along their entire length by a longitudinal center open space along which cut corn-stalks may pass from the front to the rear; an upwardly-inclined extension at the rear end of said base frame; and a platform resting on said extension and said platform hinged along its longitudinal center, so that one edge of said platform may tilt down while the opposite edge tilts up.

5. In a corn harvester machine, the combination of a horizontal base frame; means on the said frame to cut standing corn-stalks; means to move the cut stalks to the rear of the machine; a platform supported at the rear of the machine—said platform hinged along its longitudinal center so that one edge will tilt down and the opposite edge tilt up; a catch-hoop pivoted at the rear of the machine and engaging said platform; a rock-shaft mounted forward in the machine and having a crank-arm to be operated manually; and a rod one end of which connects with said catch hook and the other end with said rock-shaft.

6. In a corn harvester machine, the combination of a horizontal base frame; means on the said frame to cut standing corn-stalks; means to move the cut stalks to the rear of the machine; a platform supported at the rear of the machine—said platform hinged along its longitudinal center so that one edge will tilt down and the opposite edge tilt up and said platform provided at its down-tilting edge with hooks or guards to prevent the ground from injuring the edge at the time the platform tilts.

7. In a corn harvester machine, the combination of a horizontal base frame; two side walls resting on said frame separated along their entire length by a longitudinal center open space along which cut corn-stalks may pass from the front to the rear; a platform supported at the rear end of the machine and hinged to tilt down at one side and tilt up at the other; and a stationary upright wind board also at the rear end and having the plane of its flat surface alined in a direction longitudinal of the machine and at the side of the said center open space opposite that at which the platform tilts down.

8. In a corn harvester machine, the combination of a horizontal base frame; two side walls resting on said frame separated along their entire length by a longitudinal center open space along which cut corn-stalks may pass from the front to the rear; a platform supported at the rear end of the machine and hinged to tilt down at one side and tilt up at the other; a stationary upright wind board also at the rear end and having the plane of its flat surface alined in a direction longitudinal of the machine and at the side of the said center open space opposite that at which the platform tilts down; and an upright side board, 116, whose upper edge laps loosely over the bottom edge of the wind board and whose bottom edge is connected by hinges with the up-tilting edge of the platform.

GEORGE DAVIS NEAVITT.

Witnesses:
C. C. HINES,
BENNETT S. JONES.

Copies of this patent may be obtained for five cents each, by addressing the "Commissioner of Patents, Washington, D. C."